United States Patent [19]
Lightle et al.

[11] Patent Number: 6,059,915
[45] Date of Patent: *May 9, 2000

[54] METHOD OF MAKING A RETROREFLECTIVE APPLIQUE

[75] Inventors: Vera L. Lightle, Hudson, Wis.; Britton G. Billingsley, St. Paul, Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/810,097

[22] Filed: Mar. 3, 1997

Related U.S. Application Data

[63] Continuation of application No. 08/409,855, Mar. 23, 1995, abandoned.

[51] Int. Cl.[7] .............................. B32B 31/26; G02B 5/128
[52] U.S. Cl. ..................... 156/238; 156/240; 156/241; 156/249; 156/327; 156/276
[58] Field of Search ..................... 156/230, 238, 156/240, 241, 327, 247, 249, 307.4, 276; 359/529, 530, 536, 538; 428/143, 325, 913

[56] References Cited

U.S. PATENT DOCUMENTS

| | | | |
|---|---|---|---|
| Re. 30,892 | 3/1982 | Bingham et al. | 428/241 |
| 3,758,192 | 9/1973 | Bingham | 350/105 |
| 3,836,227 | 9/1974 | Holmen et al. | 350/105 |
| 4,103,060 | 7/1978 | Bingham et al. | 428/241 |
| 4,263,345 | 4/1981 | Bingham | 427/163 |
| 4,401,494 | 8/1983 | Pernicano et al. | 156/155 |
| 4,505,967 | 3/1985 | Bailey . | |
| 4,533,592 | 8/1985 | Bingham | 428/213 |
| 4,672,089 | 6/1987 | Pricone et al. . | |
| 4,763,985 | 8/1988 | Bingham | 350/105 |
| 4,767,659 | 8/1988 | Bailey et al. | 428/203 |
| 4,896,943 | 1/1990 | Tolliver et al. | 350/105 |
| 4,897,136 | 1/1990 | Bailey et al. | 156/145 |
| 4,968,063 | 11/1990 | McConville et al. | 283/72 |
| 4,983,436 | 1/1991 | Bailey et al. | 428/40 |
| 5,060,981 | 10/1991 | Fossum et al. | 283/109 |
| 5,064,272 | 11/1991 | Bailey et al. | 359/541 |
| 5,066,098 | 11/1991 | Kult et al. | 359/540 |
| 5,080,463 | 1/1992 | Faykish et al. | 359/536 |
| 5,128,804 | 7/1992 | Lightle et al. | 359/515 |
| 5,169,707 | 12/1992 | Faykish et al. | 428/195 |
| 5,200,262 | 4/1993 | Li | 428/266 |
| 5,283,101 | 2/1994 | Li | 428/141 |

FOREIGN PATENT DOCUMENTS

| | | | |
|---|---|---|---|
| 91108249 | 6/1993 | China | D06Q 1/10 |
| 0 291 178 A1 | 11/1988 | European Pat. Off. | G02B 5/128 |

OTHER PUBLICATIONS

Encyclopedia of Polymer Science & Engineering (2nd Edition) p. 350–351.

Alfrey et al, Organic Polymers, 1967, Prentice Hall, Inc. p. 114–115.

(List continued on next page.)

*Primary Examiner*—Sam Chuan Yao
*Attorney, Agent, or Firm*—Karl G. Hanson; Stephen C. Jensen

[57] ABSTRACT

A retroreflective applique (10) includes a supporting structure (12), a layer of optical lens elements (14), and a reflective material (16). The layer of optical lens elements (14) is partially embedded in the supporting structure (12), and the reflective material (16) is disposed on the embedded portion of the layer of optical lens elements (14). The supporting structure (12) may contain a binder layer (24) and a heat-activatable adhesive layer (26). The binder layer (24) includes a non-filamentary acrylic polymer layer. The use of such a supporting structure (12) eliminates the need for a release liner on the rear surface (20) of the heat-activatable adhesive layer (26), and it also enables a carrier web (28) to be separated from the polymeric supporting structure (12) before the applique (16) is permanently secured to a substrate. The separation step can be accomplished without causing substantial harm to the retroreflective performance of the applique (10).

6 Claims, 2 Drawing Sheets

OTHER PUBLICATIONS

C. Crisp et al., An Infra–red Spectroscopic Study of Cement Formation Between Metal Oxides and Aqueous Solutions of Poly(acrylic acid), Journal of Materials Science, 11, pp. 36–48 (1976).

M.A. Romero et al., IR Spectroscopy Approach for the Study of Interactions Between an Oxidized Aluminum Surface and a Poly(Propylene–g–Acrylic Acid) Film, Journal of Applied Polymer Science, vol. 47, pp. 543–554 (1993).

A. Stralin et al., Improved Adhesion Strength Between Aluminum and Ethylene Copolymers by Hydration of the Aluminum Surface, Journal of Applied Polymer Science, vol. 49, pp. 511–521 (1993).

Union Carbide product literature for *Organofunctional Silanes*(1991–1992).

Rohm and Haas Company, *Textile Chemicals Technical Bulletin*, "Rhoplex® HA–8, Rhoplex HA–12, Rhoplex HA–16" (1979).

BFGoodrich product literature for *Estane® Thermoplastic Polyurethane for General Extrusion Applications*.

Dow Corning product literature for *Dow Corning® Organofunctional Silanes*.

Dow Chemical USA product literature for *Primacor Adhesive Polymer 3440*.

Good Year product literature for *Typical Properties of Vitel® 4450*.

Henkel Corporation product literature for *Field of Application for Henkel Additives in Coatings and Adhesive Systems* (1988).

Henkel Corporation product literature for *Macromelt®, Adhesive Selection Report #3*.

METHOD OF MAKING A RETROREFLECTIVE APPLIQUE

This is a continuation of application Ser. No. 08/409,855 filed Mar. 23, 1995 now abandoned.

TECHNICAL FIELD

This invention pertains to a retroreflective applique that can be furnished to a garment assembler without a carrier and without a release liner.

BACKGROUND OF THE INVENTION

Retroreflective appliques have the ability to return a substantial portion of incident light back towards the light source. This unique ability has promoted widespread use of retroreflective appliques on clothing. Persons who work or exercise near motor vehicle traffic need to be conspicuously visible so that they do not get struck by passing motor vehicles. When placed on clothing, the retroreflective appliques highlight a person's presence by retroreflecting light from motor vehicle headlamps.

A retroreflective applique typically comprises an optical lens element layer, a polymeric binder layer, and a reflective layer. The optical lens elements commonly are microspheres that are partially embedded in the polymeric binder layer. The reflective layer typically comprises aluminum, silver, or a dielectric mirror that usually is disposed on the embedded portions of the microspheres. Light striking the front surface of the retroreflective applique passes through the microspheres and is reflected by the reflective layer to re-enter the microspheres where the light's direction is then altered to travel back towards the light source.

Retroreflective appliques have been made by partially embedding a microsphere layer in a thermoplastic carrier web, applying a reflective material over the microspheres' protruding portions, and then forming a binder layer over the coated microspheres. Often a pressure-sensitive adhesive is applied on the binder layer's back surface, and a release liner is placed over the adhesive until the applique is secured to a substrate. The completed applique (also referred to as a transfer sheet) is supplied to a garment assembler in this form, and the garment assembler secures the applique to an article of clothing by removing the release liner and adhering the applique to an outer surface of the article of clothing. The carrier is then separated from the applique to expose the microspheres so that the applique can retroreflect light. Although known retroreflective appliques demonstrate very good retroreflective performance and are very effective in highlighting a wearer's presence when light strikes the clothing at nighttime, the known appliques possess some drawbacks.

A first drawback is that the applique requires use of a carrier web that becomes discarded as waste by the garment assembler. The carrier web is not separated from the applique before the manufacturer supplies the applique to the garment assembler because the applique is not yet secured to a substrate. If the applique was separated from the carrier beforehand, the applique's binder layer and the reflective layer can become irreversibly stretched when the carrier is pulled away from the applique. This irreversible stretching can harm the applique's retroreflective performance.

A second drawback is that when the applique is secured to the substrate with heat, residual carrier web material can remain on the exposed surface of the microspheres, causing a reduction in retroreflective performance. Also, the thermoplastic carrier limits the quantity of heat that can be applied to the applique because, if too much heat is applied to the carrier, the carrier can stick to the microspheres and can become very difficult to remove. Limiting the heat supplied to the applique can cause a poor bond between the applique and the substrate.

Another drawback is that known transfer sheets are supplied to the garment assembler with a release liner that, like the carrier web, also becomes discarded as waste. Of course, it is not beneficial from an economic or environmental standpoint to discard the release liner or the carrier web as waste.

SUMMARY OF THE INVENTION

The present invention, defined by the claims appearing at the end of the specification, is disclosed in the context of novel retroreflective appliques and methods for making same.

The disclosed application of the appliques can be supplied to a garment assembler or others without a carrier web and without a release liner. The carrier web can be separated from the microspheres before the applique is secured to a substrate, allowing the carrier web to be recycled by the manufacturer and allowing more heat to be applied when heat laminating the applique to a substrate. The applique also eliminates the need for a release liner and therefore further reduces waste.

In brief summary, the disclosed retroreflective appliques comprise:

(a) a supporting structure having first and second major surfaces and containing a non-filamentary layer of an acrylic polymer, the second major surface being capable of acting as a heat-activatable adhesive;

(b) a layer of optical lens elements having a first portion protruding from the first major surface of the supporting structure and having a second portion embedded in the layer of the acrylic polymer; and (c) a reflective material disposed behind the second portion of the layer of optical lens elements.

The disclosed methods of making a retroreflective applique comprise the steps of:

(a) supporting a first portion of a layer of optical lens elements in a carrier web such that a second portion of the layer of optical lens elements protrudes from the carrier web;

(b) applying a coating of a reflective material on the second portion of the layer of optical lens elements;

(c) forming over the second portion of the optical lens elements after the reflective material has been applied a supporting structure that includes a non-filamentary acrylic polymer layer, the supporting structure being capable of acting as a heat activatable adhesive and the second portion of the optical lens elements being embedded in the acrylic polymer layer; and (d) separating the carrier web from the supporting structure to expose the first portion of the optical lens elements to produce the self-supported exposed lens retroreflective applique, the separation occurring before the retroreflective applique's supporting structure is secured to a substrate.

The applique of the invention differs from known appliques in that the optical lens elements are supported by a polymeric supporting structure that contains a non-filamentary acrylic polymer layer and that is capable of acting as a heat-activatable adhesive. The use of such a supporting structure enables the carrier web to be separated from the polymeric supporting structure before the applique is permanently secured to a substrate. This separation step can be accomplished without causing substantial damage to the retroreflective performance of the applique. The ability to separate the carrier web from the applique before the latter is secured to a substrate also is beneficial because it allows greater temperatures to be used in securing the applique to a substrate. Higher temperatures allow a stronger bond to be achieved between the applique and the substrate. Known carriers are thermoplastic and thus preclude use of higher temperatures because such temperatures cause the carrier material to stick to the microspheres. The carrier web can be retained by the manufacturer for recycle, as opposed to being supplied to a garment assembler and subsequently discarded as waste. Further, a release liner is not needed in the present invention because the applique can be heat-activatably applied rather than being applied through use of a pressure-sensitive adhesive. Thus, neither the carrier web nor the release liner become discarded by the garment assembler, making the applique and method of the invention more favorable from economic and environmental standpoints. In addition, the overall weight and volume of the applique is less, thereby reducing shipping and storage costs.

These and other advantages of the invention are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

BRIEF DESCRIPTION OF THE DRAWINGS

In the drawings.

The drawings are idealized and are not drawn to scale.

DETAILED DESCRIPTION OF THE PREFERRED EMBODIMENTS

Figure 1:
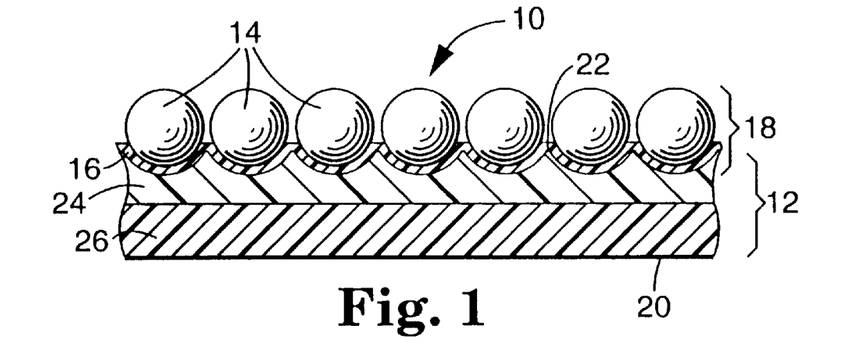
FIG. 1 is a cross-section of a retroreflective applique 10 in accordance with the present invention.

In the practice of the present invention, an exposed lens retroreflective applique is provided that can have the carrier web removed from the applique before it is secured to a substrate. FIG. 1 illustrates a portion of a retroreflective applique 10 of the invention. Retroreflective applique 10 includes a supporting structure 12, optical lens elements that may be a monolayer of microspheres 14, and a reflective material 16. Together the microspheres 14 and the reflective material 16 form a retroreflective portion 18 capable of returning a substantial quantity of incident light towards the light source. The supporting structure 12 has a first or rear surface 20 and a second or front surface 22. As shown, the supporting structure 12 contains two polymeric layers 24 and 26. Polymeric layer 24 typically is referred to as a "binder layer" and comprises a non-filamentary acrylic polymer, and layer 26 may comprise a polymer(s) capable of acting as a heat-activatable adhesive. "Non-filamentary" means the layer does not consist essentially of filaments; see contrawise, U.S. Pat. No. 5,128,804. The term "acrylic polymer" means a thermoplastic or thermoset polymer or copolymer made from acrylic acid, methacrylic acid, itaconic acid, citraconic acid, maleic acid, fumaric acid, esters of these acids, acrylonitrile, or combinations thereof Preferably, layer 26 comprises an acrylic polymer made from acrylic acid, methacrylic acid, ethyl acrylate, butyl acrylate, ethyl hexyl acrylate, or combinations thereof.

Polymeric layer 26 by itself or in conjunction with layer 24 allows polymeric supporting structure 12 to act as a heat-activatable adhesive on rear surface 20. As the term is used herein, "heat activatable adhesive" means an adhesive that can be activated by heating to more than about 50° C., allowing the applique to be bonded to a substrate by the application of pressure, where the applique and the substrate are not otherwise able to be bonded to each other at room temperature. Preferably, the adhesive is not activated until it is heated to at least 75° C.

The layer of microspheres 14 has a first portion that protrudes from the supporting structure 12 so as to be exposed to the ambient environment. In retroreflective appliques, like the present invention, where the microspheres are exposed to the ambient environment—that is, they are not enclosed or encapsulated, by for example, a polymeric cover film—are referred to as "an exposed lens retroreflective applique." The layer of microspheres 14 has a second portion embedded in the front surface 22 of polymeric supporting structure 12. Reflective material 16 is located behind the embedded portion of the layer of microspheres and preferably is disposed thereon.

The supporting structure contains one or more non-filamentary continuous polymeric layers, which together preferably have a thickness of about 25 to about 250 micrometers. By "continuous" is meant the polymeric layer does not possess any voids or openings that would render the polymeric supporting structure fluid permeable. Preferably, the supporting structure has a thickness of about 50 to 75 micrometers. Thicknesses less than 25 micrometers may be too thin to adhere to both a substrate and the optical elements, and thicknesses greater than 250 micrometers may unnecessarily stiffen the applique and add to its cost.

Layers 24 and 26 together or independently provide structure 12 and ultimately retroreflective applique 10 with a tensile strength preferably greater than $3.5 \times 10^6$ N/m$^2$. More preferably, the retroreflective applique has a tensile strength greater than $6 \times 10^6$ N/m$^2$, and still more preferably is greater than $10 \times 10^6$ N/m$^2$. At the upper end, the tensile strength may be as high as $50 \times 10^6$ N/m$^2$ but typically is less than $40 \times 10^6$ N/m$^2$. Binder layer 24 can be a self-crosslinking acrylic polymer such as HA-8™ available from Rohm and Haas, Philadelphia, Pennsylvania. As the term is used herein, "self-crosslinking" means the polymer is capable of cross-linking to produce a higher molecular weight polymer without use of crosslinking agent separate from the initial polymer. Polymeric layer 26 may be a thermoplastic polymer such as a copolymer of ethylene and acrylic acid, for example, Primacor™ 3440 available from Dow Chemical Company, Midland, Mich. Dow Corning Z-6040 adhesion promoter (available from Dow Corning, Midland, Mich.) may be used with HA-8™ to provide superior dry-cleaning and home laundering durability. Polymeric layer 26 typically is about 10 to 150 micrometers thick.

The binder layer of the supporting structure also may contain one or more additives such as colorants (for example, pigments, dyes, metal flakes), fillers, stabilizers (for example, thermal stabilizers and antioxidants such as hindered phenols and light stabilizers such as hindered amines or ultraviolet stabilizers), flame retardants, flow modifiers (for example, surfactants such as fluoropolymer silicones), plasticizers, elastomers, and coupling agents. Care should be taken when selecting such additives because some can detrimentally affect laundering durability of the retroreflective applique. Because the appliques are commonly used on clothing, laundering durability is an important consideration; see, for example, U.S. Pat. Nos. 5,200,262 and 5,283,101. It has been found that use of a substantial amount of some pigments, for example, titanium dioxide, can adversely affect post-wash retroreflectivity. Other additives, however, may improve laundering durability. For example, silane coupling agents such as Dow Corning Z 6040 may be added to the binder layer at about 1 to 15 parts by weight (dry). Elastomers—such as Hypalon™ 20 S (available from E.I. Dupont de Nemours and Company, Wilmington, Del.), Polysar™ EPM 306 P (available from Miles, Inc., Polysar Rubber Division, Akron, Ohio), and Nipol™ VT 4555 (available from Zeon Chemicals, Rolling Meadows, Ill.)—may improve laundering durability when the binder layer is an ethylene/acrylic acid copolymer. Preferably, the additives are resistant to degradation or leaching out of the polymeric supporting structure during laundering.

The supporting structure's binder layer optionally may be formulated with a colorant selected to blend with or match the color of the reflective material to mask any loss of optical lens elements which may result from scratching the front surface of applique against furniture, walls, or any other object or surface. When an optical lens element becomes displaced from the applique, a portion of the reflective material directly beneath the lens element usually also is removed from the sheeting. If the reflective material is not transparent and it does not match the color of the underlying binder layer, the loss of the optical lens element becomes noticeable.

The term "optical lens elements" means discrete elements capable of altering the direction of light so that, in conjunction with the reflective material, a substantial quantity of incident light can be retroreflected. As indicated above, the optical lens elements used in retroreflective appliques of this invention can be microspheres that, preferably, are substantially spherical in shape in order to provide the most uniform and efficient retroreflection. The microspheres preferably also are substantially transparent so as to minimize absorption of light so that a large percentage of the incident light is retroreflected. As the term is used herein, "transparent" means capable of transmitting light. Preferably, the optical lens elements transmit at least 80 percent of the intensity of incident light in the visible spectrum (about 400 to 700 nanometers (nm) wavelength). More preferably, the microspheres are capable of transmitting at least 90 percent of the intensity of light in the visible spectrum. The microspheres often are substantially colorless but may be tinted or colored in some other fashion.

The microspheres may be made from glass, a non-vitreous ceramic composition, or a synthetic resin. Glass and ceramic microspheres are preferred because they tend to be harder and more durable than microspheres made from synthetic resins. Examples of microspheres that may be used in this invention are disclosed in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414. The disclosures of these patents are incorporated here by reference.

The microspheres typically have an average diameter in the range of about 30 to 200 micrometers. Microspheres smaller than this range tend to provide lower levels of retroreflection, and microspheres larger than this range may impart an undesirably rough texture to the applique or may undesirably reduce its flexibility. The microspheres typically have a refractive index of about 1.7 to about 2.0, the range typically considered to be useful in exposed lens retroreflective products.

The reflective material can be a layer comprising an elemental metal that preferably is capable of specularly reflecting light. A variety of metals may be used to provide a specular reflective metal layer. These include aluminum, silver, chromium, gold, nickel, magnesium, and the like, in elemental form, and combinations thereof. Aluminum and silver are the preferred metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are preferred because they tend to provide the highest retroreflective brightness. The metal layer should be thick enough to reflect incoming light. Typically, the reflective metal layer is about 50 to 150 nanometers thick. Although the reflective color of a silver coating can be brighter than an aluminum coating, an aluminum layer normally is more preferred because it can provide better laundering durability when adhered to a glass optical element.

In lieu of, or in addition to, a reflective metal layer, a dielectric mirror may be employed as a reflective material. The dielectric mirror may be similar to known dielectric mirrors disclosed in U.S. Pat. Nos. 3,700,305 and 4,763,985 to Bingham. The disclosures of these patents are incorporated here by reference. When using a dielectric mirror, the optical lens elements typically have a refractive index $n_2$ and have a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, preferably at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_2>n_1<n_3$ or $n_2<n_1>n_3$, and the materials on either side of the transparent layer may be either both higher or both lower in refractive index than $n_1$. When $n_1$ is higher than both $n_2$ and $n_3$, $n_1$ is preferably in the 1.7 to 4.9 range, and $n_2$ and $n_3$ are preferably in the 1.2 to 1.7 range. Conversely, when $n_1$ is lower than both $n_2$ and $n_3$, $n_1$ is preferably in the 1.2 to 1.7 range, and $n_2$ and $n_3$ are preferably in the 1.7 to 4.9 range. The dielectric mirror preferably comprises a contiguous array of materials, at least one being in layer form, having an alternating sequence of refractive indices. In a preferred embodiment the contiguous array has from two to seven layers, preferably three to five layers, adjacent to the lens element. A dielectric mirror can provide very good retroreflectivity—although, it typically is not as efficient a reflector as a reflective metal layer.

Among the many compounds that may be used in providing transparent materials within the desired refractive index range are: high index materials such as $CdS$, $CeO_2$, $CsI$, $GaAs$, $Ge$, $InAs$, $InP$, $InSb$, $ZrO_2$, $Bi_2O_3$, $ZnSe$, $ZnS$, $WO_3$, $PbS$, $PbSe$, $PbTe$, $RbI$, $Si$, $Ta_2O_5$, $Te$, $TiO_2$; low index materials such as $Al_2O_3$, $AlF_3$, $CaF_2$, $CeF_3$, $LiF$, $MgF_2$, $Na_3AlF_6$, $ThOF_2$, elastomeric copolymers of perfluoropropylene and vinylidene fluoride (refractive index of >>1.38), et cetera. Other materials are reported in Thin Film Phenomena, K. L. Chopra, page 750, McGraw-Hill Book Company, N.Y., (1969). A preferred dielectric mirror contains succeeding layers of cryolite ($Na_3AlF_6$) and zinc sulfide.

A retroreflective applique of the invention may be formed in a sequential fashion that involves the step-wise construction of various layers. More specifically, the steps include forming a retroreflective portion comprising the optical lens elements and the reflective material and then forming the supporting structure as an overlay on the retroreflective portion.

Figure 2:
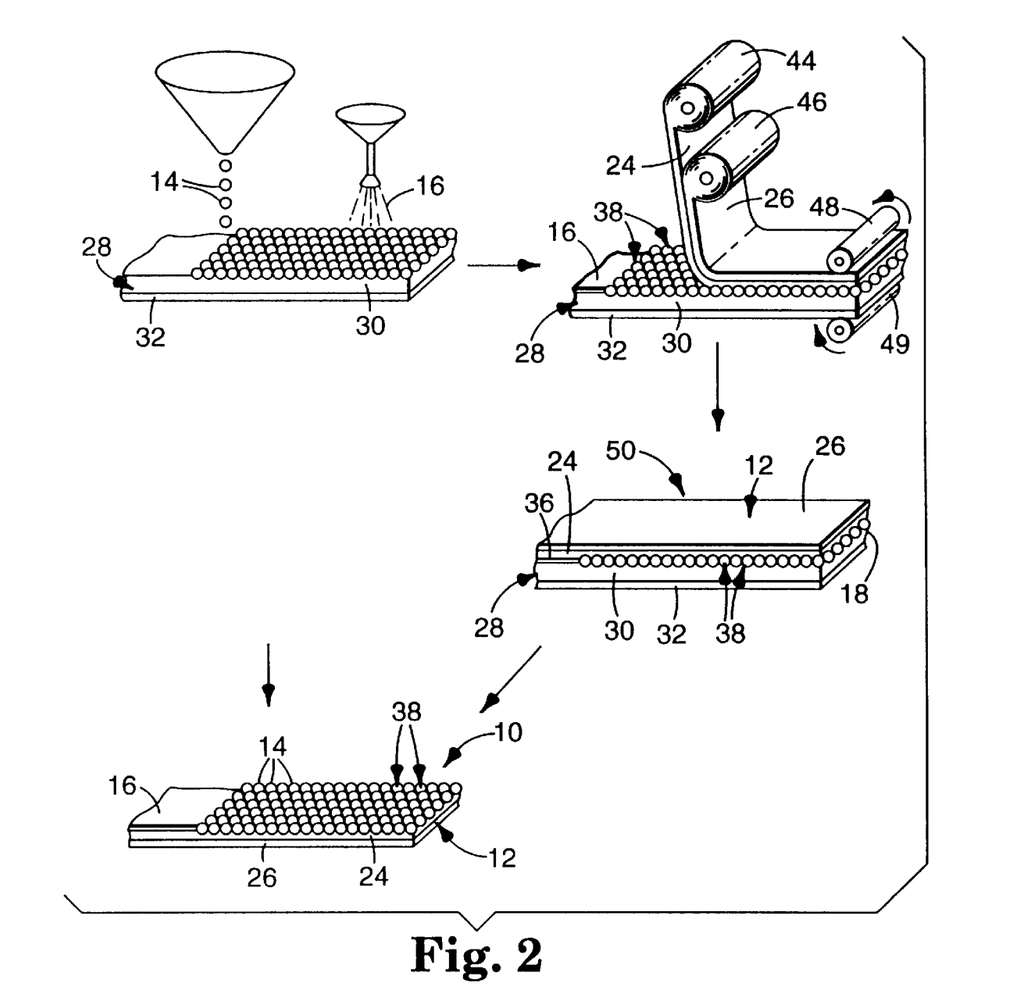
FIG. 2 schematically illustrates a method of manufacturing a retroreflective applique 10 in accordance with the present invention.

A schematic illustration of a method of preparing a retroreflective applique 10 of the invention is shown in FIG. 2, where a monolayer of the optical lens elements is first assembled by cascading transparent microspheres 14 onto a carrier web 28 which secures the microspheres 14 in a desired temporary assignment. Microspheres 14 can be partially embedded in carrier web 28, composed of a heat softened polymeric lining 30 on a paper sheet 32. Some examples of useful polymers for polymeric lining 30 include polyvinyl chloride, polysulfones, polyalkylenes such as polyethylene, polypropylene and polybutylene, polyesters, and the like. Microspheres 14 preferably are packed as closely as possible, ideally in their closest hexagonal arrangement, to achieve very good retroreflective brightness and may be so arranged by any convenient application process, such as printing, screening, cascading, or hot rolling.

Upon cooling, polymer lining 30 retains microspheres 14 in a desired arrangement. A reflective material 16 such as a specularly reflective metal or dielectric mirror then is applied to the carrier web 28 and the microspheres 14 so that the protruding portions of the microspheres 14, as well as the exposed portions of polymer 30, become coated with a reflective material layer 16. This technique facilitates the arrangement of the retroreflective elements 38 (optical lens elements and reflective material) in substantially uniform direction for retroreflection. The size of the retroreflective elements 38, as indicated by the surface portion of the microspheres 14 covered with the reflective material 16 may be controlled in part by controlling the depth to which the microspheres 14 are embedded in the polymer 30 prior to applying the reflective material 16.

After the retroreflective elements 38 have been formed on carrier web 28, the supporting structure 12 then is formed over the retroreflective elements 38. This may be accomplished by applying juxtapositioned polymer sheets 24 and 26 onto the retroreflective elements 38. Polymeric sheets 24 and 26 may be thermoplastic polymers of an acrylic latex and a heat-activatable material, respectively. Polymeric sheets 24 and 26 come off rolls 44 and 46, respectively. After the polymer sheets 24 and 26 are placed on top of retroreflective elements 38, sheets 24 and 26, along with retroreflective elements 38 and carrier web 28, are passed through nip rolls 48 and 49. Heat is supplied, typically, through nip roll 48 to cause polymer sheets 24 and 26 to be bonded to each other and ultimately to retroreflective elements 38. Upon exiting the nip rolls 48 and 49, a composite structure 50 is thereby formed which contains supporting structure 12, a retroreflective portion 18 (that includes the monolayer of retroreflective elements 38), and a carrier web 28. Carrier web 28 may be separated from retroreflective portion 18 and polymeric supporting structure 12 to provide a retroreflective applique 10 in accordance with the present invention. Retroreflective applique 10 consists essentially of a monolayer retroreflective elements 38 and a polymeric supporting structure 12. The retroreflective applique 10 can be rewound upon a spool (not shown) and stored in this fashion until it is desired to secure the applique 10 to a substrate.

Retroreflective appliques made in accordance with the invention can retain at least 75 percent of their retroreflectivity by separating the carrier from the applique before the latter is secured to a substrate with heat. More preferably, retroreflective appliques can retain at least 95 percent of their retroreflectivity. Still more preferably, the inventive retroreflective appliques are able to demonstrate an improvement (that is, retain more than 100%) in retroreflectivity by removing the carrier web before the applique is heat-secured to a substrate. An applique that has the carrier removed before being secure to a substrate with heat can perform more than 40 percent better, and even more than 75 percent better, than a like applique that has the carrier removed after the applique is secured to a similar substrate with heat. The percent retroreflectivity retained may be determined in accordance with ASTM E 810-93b as illustrated below in the Examples. Articles of the invention also can be launderably durable, and after being subjected to a "Home Wash Laundering Durability Test", can retain at least approximately 40 percent of their initial retroreflectivity as measured by the coefficient of retroreflection, $R_A$. More preferably, samples of the invention retain at least 50 percent of their initial retroreflectivity.

The separated carrier web 28 may be reused by the manufacturer to produce another retroreflective applique. The retroreflective applique on the spool may be delivered to a garment assembler without a carrier web or a release liner. The garment assembler then may retrieve the desired length of retroreflective applique from the spool and adhere it to a substrate simply by applying heat. The substrate may be essentially any surface that allows the retroreflective applique to be heat-laminated thereto. The substrate may be, for example: a woven or non-woven fabric such as a cotton fabric; a polymeric layer including nylons, olefins, polyesters, cellulosics, urethanes, vinyls, and acrylics; natural or synthetic rubbers; material; leather and the like. Temperatures exceeding 200° C., and higher than 250° C., may be used to secure appliques of the invention to substrates. Before the present invention, temperatures of about 150 to 190° C. were commonly used.

Figure 3:
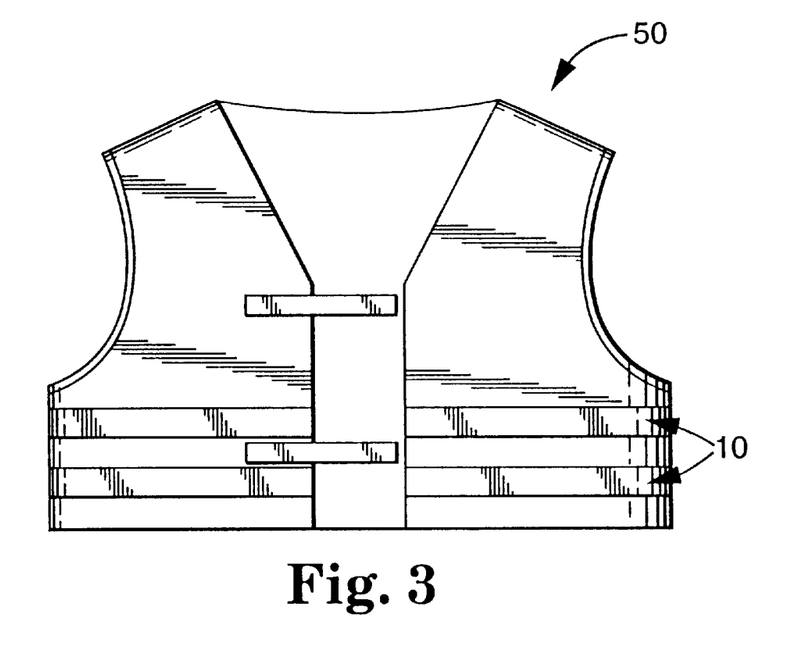
FIG. 3 is a front view of an article of clothing 60 bearing a retroreflective applique 10 in accordance with the present invention.

In FIG. 3, retroreflective appliques 10 are shown secured to the outer surface of a safety vest 50. Safety vest 50 has retroreflective appliques 10 secured thereto in the form of stripes. The stripes become illuminated at nighttime when incident light strikes the safety vest 50. The illumination of the retroreflective appliques 10 on safety vest 50 highlights the wearer's presence. Although safety vest 50 has been chosen for illustration, the article of clothing may come in a variety of forms. As the term is used herein, "article of clothing" means a launderable item of wearing apparel sized and configured to be worn or carried by a person. Other examples of articles of clothing that may display retroreflective appliques in accordance with the invention include shirts, sweaters, jackets, coats, pants, shoes, socks, gloves, belts, hats, suits, one-piece body garments, bags, backpacks, et cetera.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Example 1

A paper carrier web was coated on one side with low density polyethylene. The polyethylene side was covered with a monolayer of glass microspheres having a refractive index of 1.92. The glass microspheres were partially embedded in the polyethylene to about 40 percent of their average diameter of 60 microns by heating the web to about 138° C. The non-embedded portions of the glass microspheres were vacuum coated with aluminum of 65–70 nanometers in thickness.

A self-crosslinking acrylic emulsion having the composition set forth in Table A was cast onto the monolayer of aluminum coated microspheres embedded in the carrier. The cast emulsion was dried by first exposing to room temperature conditions (22° C., 50% relative humidity) for about 40 seconds followed by consecutive exposures in air circulating ovens (with exhaust) 40 seconds at 66° C., 80 seconds at 82° C. and 160 seconds at 99° C., respectively. The resulting partially cured film has a coating weight of about 70 grams per square meter and a tensile at break of 2 to 12 grams per millimeter (g/mm).

TABLE A

| Component | Parts by Weight |
| --- | --- |
| Aqueous emulsion comprising 54 percent water and 46 weight percent of a copolymer of ethyl acrylate and methylol acrylamide (Rhoplex ™ Ha-8 from Rohm & Haas, Philadelphia, Pennsylvania) | 39.42 |
| Acrysol ASE-60, aqueous emulsion containing crosslinked acrylic emulsion copolymer of 28 weight percent and 82 weight percent water (Rohm & Haas) | 2.06 |
| Antifoam agent (Foamaster DF-160-L from Henkel Corp.) diluted to 50% with water | 0.23 |
| Ammonium nitrate catalyst (diluted with water 1:9) | 0.47 |
| Ammonium hydroxide (aqueous 28–30% weight/weight) | 0.31 |
| Silane coupling agent (Dow Corning Z 6040, Midland, Michigan) | 1.96 |
| Di-ionized water | 55.55 |

A 75 micron heat activated ethylene acrylic acid film (Primacor™ 3440) was laminated to the acrylic layer at 104° C.

Retroreflective Brightness Test

The coefficient of retroreflection $R_A$, reported in candelas per lux per square meter (cd/lux/m$^2$), was measured using standardized test ASTM E 810-93b on samples with carrier removed before lamination to a fabric (CRBL) and carrier removed following lamination (CRFL) at 162° C. for 25 seconds of dwell time. The entrance angle used in ASTM E 810-93b was −4 degrees, and the observation angle was 0.2 degrees. Reference to "ASTM E 810-93b" herein means ASTM E 810-93b where the entrance and observation angles are as specified in the previous sentence. The test results are set forth in Table 1.

TABLE 1

| Example | Fabric | Coefficient of Retroflection $R_A$ (cd/lux/m$^2$) | | Relative Percent Increase in Retro-flectivity |
| --- | --- | --- | --- | --- |
| | | CRBL | CRFL | |
| 1a | 100% Cotton | 499 | 375 | 133 |
| 1b | 100% Nylon | 495 | 370 | 134 |
| 1c | 65% Polyester/35% Cotton | 499 | 362 | 138 |

The data set forth in Table 1 demonstrates a higher brightness, expressed as the coefficient of retroreflection when the carrier web is removed before laminating the retroreflective applique to a fabric. Polyethylene from the carrier paper is transferred to some degree to the exposed microsphere surface during the lamination process, thus, limiting the lamination temperature. The overall effect is a lower coefficient of retroreflection for the samples where the carrier was removed following lamination.

Examples 2–4 are similar to Example 1 but different heat-activatable adhesive chemistries were used. The resulting retroreflectivity values demonstrate the advantages of higher brightness performance when the carrier is removed before laminating the retroreflective applique to the fabric substrate.

The results are set forth in Table 2.

TABLE 2

| Example | Adhesive | Coefficient of Retroflection (cd/lux/m$^2$) | | Relative Percent Increase in Retro-flectivity |
| --- | --- | --- | --- | --- |
| | | CRBL | CRFL | |
| 2 | Estane ™ 58570 (B. F. Goodrich) | 515 | 284 | 181 |
| 3 | Vitel ™ 4450 (Goodyear Tire & Rubber) | 579 | 352 | 164 |
| 4 | Macromelt ™ 6301 (Henkel Corp.) | 566 | 342 | 165 |

Home Wash Laundering Durability Test

Fabrics having the samples attached thereto were then subjected to a series of home laundering tests wherein each sample was subjected to a total of 25 wash cycles and a total of 5 drying cycles. The following test methods were used: each sample was washed for 5 consecutive cycles in a Maytag Model LS7804 automatic washing machine using the following settings: "Regular" action (setting 10), "Large" Load, "Regular" fabric, and "Hot/Cold" Temperature. The washing machine was attached to a temperature-controlled water supply providing an initial water temperature of about 38° C. (100° F.). Forty (40) grams of a standard detergent, obtained from the American Association of Textile Chemists and Colorists (AATCC) Technical Center, P.O. Box 12215, Research Triangle, N. C. 27709, were used for each wash cycle. Each wash cycle was followed by a cold water rinse cycle. After every fifth wash/rinse cycle, each sample was tumble-dried in a Maytag Model LS7804 dryer, using machine settings of 60° C. (140° F.) Temperature and "Regular" Fabric until the total load was dry. Each sample then was tumbled for a 5–10 minute cooling period in the dryer with the heat turned off. After each drying cycle, each sample was tested for retroreflective performance in accordance with ASTM E 810-93b. The complete sequence of 5 wash cycles and 1 dry cycle was repeated 5 times. All samples in Table 3 were tested with carrier removed before lamination. Results are as follows:

TABLE 3

| Example | Coefficient of Retroreflectivity, $R_A$ (cd/lux/m$^2$) - Before Laundry | Coefficient of Retroreflectivity, $R_A$ (cd/lux/m$^2$) - After 25 Laundry Cycles |
|---|---|---|
| 1a | 409 | 177 |
| 1b | 419 | 178 |
| 1c | 407 | 129 |
| 2 | 472 | 203 |
| 3 | 565 | 299 |
| 4 | 524 | 172 |

The data in Table 3 show that articles made in accordance with the method of the invention can demonstrate good laundering durability.

Various modifications and alterations may be made to the invention without departing from its spirit and scope. Accordingly, it is to be understood that the invention is not to be limited to the above-described, but is to be controlled by the limitations set forth in the following claims and any equivalents thereof. It is also to be understood that the invention may be suitably practiced in the absence of any element not specifically disclosed herein.

What is claimed is:

1. A method of making a substrate retroreflective, comprising:
    (a) providing a substrate; and
    (b) applying to the substrate a retroreflective applique in at least one continuous stripe, the retroreflective applique being made by a method that consists essentially of:
    (c) supporting a first portion of a layer of optical lens elements in a carrier web such that a second portion of the layer of optical lens elements protrudes from the carrier web;
    (d) applying a coating of a reflective material on the second portion of the layer of optical lens elements;
    (e) forming over the second portion of the optical lens elements after the reflective material has been applied a supporting structure that has first and second major surfaces and that includes a non-filamentary self-crosslinked acrylic polymer layer, the second portion of the optical lens elements being embedded in the acrylic polymer layer, the supporting structure also including a layer of a heat-activatable adhesive that terminates at the second major surface; and
    (f) separating the carrier web from the supporting structure to expose the first portion of the optical lens element to produce the self-supported exposed lens retroreflective applique, the separation occurring before the retroreflective applique's supporting structure is secured to the substrate;
    wherein the non-filamentary self-crosslinked acrylic polymer layer is formed by providing a coating of acrylic copolymer and drying the coating by exposing the coating to consecutively higher temperatures, the self-crosslinking of the acrylic polymer occurring substantially during and as a result of the drying.

2. The method of claim 1, wherein the retroreflective applique is able to demonstrate a coefficient of retroreflection of 300 to 600 candelas per lux per square meler after being subjected to a home wash laundering durability test comprising:

five consecutive wash cycles in a Maytag Model LS7804 automatic washing machine or the like using machine settings of Regular action, Large load, Regular fabric, and Hot/Cold temperature, with an initial water temperature of about 38° C. and using about 40 grams of standard detergent; and tumble drying in a Maytag Model LS7804 dryer or the like, using machine settings of 60° C. temperature and Regular fabric, until dry, followed by tumble drying for a 5 to 10 minute cooling period with the heat turned off.

3. The method of claim 1, wherein the retroreflective applique is able to retain at least 40% of its retroreflectivity after being subjected to a home wash laundering durability test comprising:

five consecutive wash cycles in a Maytag Model LS7804 automatic washing machine or the like using machine settings of Regular action, Large load, Regular fabric, and Hot/Cold temperature, with an initial water temperature of about 38° C. and using about 40 grams of standard detergent; and tumble drying in a Maytag Model LS7804 dryer or the like, using machine settings of 60° C. temperature and Regular fabric, until dry, followed by tumble drying for a 5 to 10 minute cooling period with the heat turned off.

4. The method of claim 1, wherein the retroreflective applique is applied to the substrate with heat at a temperature exceeding 200° C.

5. The method of claim 1, wherein the forming step comprises applying the coating of acrylic copolymer to the second portion of the optical lens elements after the reflective material has been applied.

6. The method of claim 1, wherein the drying comprises raising the temperature of the coating using an oven.

* * * * *

UNITED STATES PATENT AND TRADEMARK OFFICE
CERTIFICATE OF CORRECTION

PATENT NO.   : 6,059,915
DATED        : May 9, 2000
INVENTOR(S)  : Lightle, Vera L.

It is certified that error appears in the above-identified patent and that said Letters Patent is hereby corrected as shown below:

Column 2,
Line 18, delete "application of the" and insert in place thereof -- retroreflective --.

Column 9,
Line 45, delete "Silane coupling agent" and insert in place thereof -- Organo functional silane adhesion promotor --.

Column 10,
Line 7, delete "Retro - flectivity" and insert in place thereof -- Retroreflectivity --.
Line 34, delete "Retroflection" and insert in place thereof -- Retroreflection --.
Line 35, delete "Retro - flectivity" and insert in place thereof -- Retroreflectivity --.

Column 12,
Line 13, delete "meler" and insert in place thereof -- meter --.

Signed and Sealed this

Tenth Day of December, 2002

JAMES E. ROGAN
*Director of the United States Patent and Trademark Office*